(No Model.)
W. BUNDY.
SAW.
No. 388,820.          Patented Sept. 4, 1888.
Fig. I.
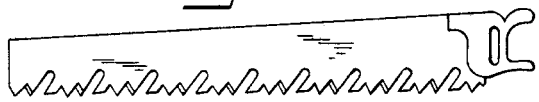
Fig. II.      Fig. III.
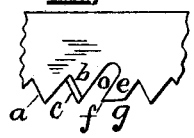 
Fig. IV.      Fig. V.
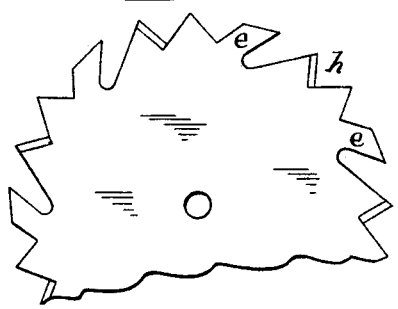 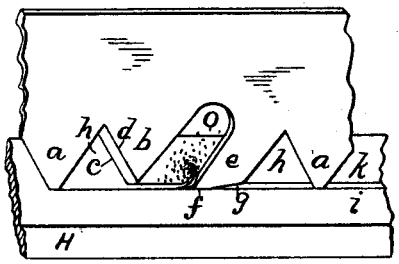
Fig. VI.
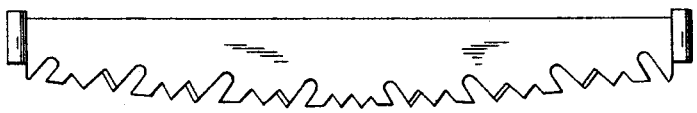
Witnesses:
B. M. Whitaker.
F. B. Townsend.
Inventor,
Warren Bundy.
By his Attorney Jas. A. Cowles.

UNITED STATES PATENT OFFICE.

WARREN BUNDY, OF MINNESOTA CITY, MINNESOTA, ASSIGNOR OF TWO-THIRDS TO OTTO TROOST, OF SAME PLACE, AND GILBERT MONTAGUE, OF CHICAGO, ILLINOIS.

SAW.

SPECIFICATION forming part of Letters Patent No. 388,820, dated September 4, 1888.

Application filed October 6, 1887. Serial No. 251,583. (No model.)

*To all whom it may concern:*

Be it known that I, WARREN BUNDY, a citizen of the United States, residing at Minnesota City, in the county of Winona, in the State of Minnesota, have made certain new and useful Improvements in Saws, of which the following is a specification.

The nature and object of this invention are to produce a saw having teeth of such a character as will be strong and durable, and that will work with equal facility crosswise or lengthwise of the grain, and will answer all purposes of a saw for general utility purposes, and also will work with less power than the ordinary saw.

Figure I is a side elevation of my improved saw. Fig. II is a detail of a portion of the saw larger than in Fig. I. Fig. III is a detail of a portion of the saw larger than that shown in Fig. II. Fig. IV is a section of a circular saw provided with my improved teeth. Fig. V is an illustration of the saw in the act of cutting or sawing. Fig. VI is a side elevation of a crosscut-saw provided with my improvement.

The teeth $a$ and $b$ are made with a cutting or knife edge the entire length of their front side and at one edge of the front side. This cutting-edge is formed by cutting the front side so the cutting-edge will be in advance of the opposite edge of this same front side. This makes this front side beveling, the cutting-edge $c$ being in advance of its opposite edge, $d$. The tooth $a$ is formed in the same manner, but is beveled in the opposite direction, the tooth $b$ being beveled to the left and the tooth $a$ being beveled to the right. This makes the cutting-edges of the teeth on opposite sides of the saw. The incline of the bevel-surface on each cutting-tooth is sufficient to make a clear cutting-edge on each tooth. The cutting-teeth $a$ and $b$ are arranged in sets or pairs of two each, with cutting edges on opposite sides.

Immediately in the rear of each set of cutting-teeth is a chisel or clearing tooth, $e$, made with front and rear edges parallel, or nearly so, and in its length inclining to one side of a line drawn directly across and through the depth of the blade of the saw. The cutting or clearing edge $f$ of this tooth is directly across the travel of the saw and at the front of the tooth. The front edge of this clearing-tooth extends farther down from the blade than the heel $g$ thereof. In front of the clearing-tooth is the space $o$, made deeper than the space $h$ between the two cutting-teeth. Its depth determines the length of the front edge of the clearing-tooth $e$, and the depth of the space $h$ determines the length of its rear edge. The clearing-tooth $e$ is slightly shorter than the cutting-teeth $a\,b$.

H, Fig. V, represents a piece of wood.

In use this improvement works as follows: The cutting-tooth $a$ cuts a gash, $i$, at one side of the space cut away by the saw. The cutting-tooth $b$ cuts a gash, $k$, on the opposite side of this and parallel with the gash $i$, leaving the wood between these gashes unmolested. The clearing-tooth $e$, immediately following, clears out this space between the gashes. In Fig. V is illustrated the teeth forming this saw. The cutting-teeth $a$ and $b$ have cut the two parallel gashes $k\,i$ in advance of the clearing-tooth $e$. The immediate points of these teeth are shown as embedded in the wood. Directly at the rear of these cutting-teeth follows the clearing-tooth $e$ and removes the material bounded by the two gashes $k\,i$, the space $o$ in front of the clearing-tooth affording store-room for the sawdust until it passes beyond the edge of the wood being cut.

It will be observed that the office of the cutting-teeth $a$ and $b$ is to cut gashes at each side of the space cut away by the saw, and the office of the clearing-tooth $e$ is to clear out the space between these two gashes. The wood between the cutting-teeth before the clearing-teeth have passed at its sides is divided from the rest of the wood by the cutting-teeth; and the clearing-teeth perform the double duty of cutting loose and clearing it out, and in order to be able to accomplish this successfully at all times, particularly when the saw is working through knots, each clearing-tooth must be made in the strongest possible manner, especially at and near their cutting-edges. This is accomplished by making the front and rear edges parallel. This makes the stock of the tooth of uniform thickness and strength its entire length, and, being chamfered at its end only sufficiently to form a cutting-edge, it is made in the strongest manner at this point, where the constant strain occurs. The teeth *a* and *b*, being provided with cutting or knife edges *c*, cut the fibers of the wood directly, and do not tear or break them off, as is done by the teeth in an ordinary saw. Thus the sides of the space cut away by the saw are left comparatively smooth and free from the rough or velvety character shown in cuts made by the ordinary saw. It is manifest, then, that this saw will do the work with less power than the old form of saw. The sides of the cut-away part being comparatively smooth and free from a rough and velvety character, it follows that the two gashes *k i* need be but a slightly greater distance apart than is the width of the saw-blade; hence my improved saw in any kind of work it is required to do will cut away a less space than can be done by the old style of saw, because of the little or no set required. Thus a great saving of material can be accomplished. The cutting-teeth *a* and *b* having thin cutting-edges *c* their entire length, they can be pressed into the wood deeper and thus accomplish the work of sawing much faster than teeth made in the old form. The cutting-teeth are made in form to give them the greatest possible strength, being re-enforced at every point from their slightest tip to their greatest width. The rear edge of the clearing-tooth being shorter than its front edge re-enforces this tooth and gives it greater strength. These forms of teeth can be used in any kind of saw, and with the same effect as to lightness of power required, smoothness of the sides cut, rapidity of execution, and economy of material. In Fig. IV they are shown on a circular saw. In Fig. VI is shown a crosscut-saw with this form of teeth, with the teeth in each half of the saw pointing in opposite directions. This saw also will work with equal facility in cutting crosswise of the grain or parallel with it. This is manifest on inspection. The cutting-teeth *a* and *b* cut the gashes on each side of the space cut away, and the clearing-teeth clear out the space between the gashes just the same as when cutting crosswise of the grain and with the same saw used in cutting crosswise of the grain. Thus can a single saw of my improved pattern do double duty, the same as is required of two saws of the old pattern. A single saw of my pattern for general utility purposes serves the same ends that two or more do of the old style.

Furthermore, it will be observed that each cutting-tooth has but one cutting-edge, and that is on the edge toward the line of travel of the saw, the rear edge of each tooth being blank.

This improvement is applicable to any saw designed to cut the entire length and thickness of any kind of material to be sawed.

This application is an improvement on application No. 236,325, filed 1887, made by me.

A great advantage is derived from making the gully with edges parallel, or nearly so, with oval extreme end, and without bevel or cutting edges, as it enables me to make the gully in such a direction into the blade as will give the greatest possible strength to the clearing-teeth, and at the same time to maintain the size and character of the teeth notwithstanding repeated filing. The oval end of the gully makes the blade stronger than it would be if it were of angular form, and the edges bounding the gully not being cutting-edges, less skill and time are required to keep the saw in order.

As the saw moves with great velocity, any angle or bevel of any part of the surface that the sawdust could back up against, and thus cause it to wedge between the bevel surface of the saw and the stationary side of the wood, would create friction to an enormous extent, and would require very great power to overcome it. All this is avoided in my improvement, as every surface of the saw coming in contact with the sawdust is directly across the travel of the saw, and the sawdust is pushed or forced directly in the line of the travel of the saw, with no lateral or side thrust, and thus avoids all wedging and increase of friction. The chisel-teeth are placed at a slight angle with the radius and a direct line across the blade of the saw.

I claim—

As an article of manufacture, a saw provided with two kinds of teeth, two of which are cutting-teeth and one a clearing-tooth, the cutting-teeth being divided and defined by an angular space and provided with alternate cutting-edges facing the blank rear edge of the opposite cutting-teeth, the clearing-teeth being in chisel form, with parallel front and rear edges, the rear edge being shorter than the front edge, placed at a slight angle with the radius and direct line across the body of the saw, slightly chamfered at the end to form a cutting-edge next to the gully and directly across the travel of the saw, and a little shorter than the cutting-teeth, each set of teeth being divided by an oval-ended loop-formed gully extending deeper into the blade than the other divisions at the same angle with the radius and direct line across the blade of the saw, capable of being filed or cut deeper into the blade, as required, and the sides of which are not beveled, but directly across the travel of the saw.

WARREN BUNDY.

Witnesses:
M. B. WEBBER,
OTTO TROOST.